Sept. 27, 1966 G. MOUNTJOY 3,276,010

METHOD AND MEANS FOR CORRECTING OUTPUT INDICATIONS OF AN ENCODER

Filed July 30, 1963 3 Sheets-Sheet 1

INVENTOR.
GARRARD MOUNTJOY

BY

*By Darby & Darby*

ATTORNEYS

INVENTOR.
GARRARD MOUNTJOY
BY Darby & Darby
ATTORNEYS

INVENTOR.
GARRARD MOUNTJOY
BY Darby & Darby
ATTORNEYS

United States Patent Office 3,276,010

Patented Sept. 27, 1966

3,276,010

METHOD AND MEANS FOR CORRECTING OUTPUT INDICATIONS OF AN ENCODER

Garrard Mountjoy, Little Rock, Ark., assignor to Baldwin Electronics, Inc., Little Rock, Ark., a corporation of Arkansas Filed July 30, 1963, Ser. No. 298,645
11 Claims. (Cl. 340—347)

The present invention relates to encoders and particularly to analog to digital encoders and relates particularly to such encoders of the type in which the encoder is in the form of a disc and is shaft mounted.

Encoders of the type mentioned are utilized to indicate the rotational position of a shaft relative to a fixed reference or zero point and to express that position in a digital manner, i.e., either in degrees, minutes and seconds of an arc or in percentages of a complete rotation.

Encoders of the type mentioned have been used for a considerable period of time and consist of a plurality of concentric circular tracks each including opaque and clear portions, the portions of the various tracks in combination comprising the coded material, these portions ordinarily being arranged in a manner to form a binary code, either a pure binary or some form of modified binary code.

It has been found in practice that frequently mechanical elements of the mounting of the code disc or elements of the mechanism through which the disc is driven cause deviations of the disc from its true position and thus produce errors in the output readings.

For example, the shaft bearing may be such that there is a runout of the shaft amounting to an eccentricity of 0.0002″. Such an error can readily produce as much as one quantum of error in the reading where a quantum is defined as being the angular space representative of a single digit. If this error were to be reduced to ½ the value it would be necessary to construct a bearing having twice the precision of that discussed above, namely, a bearing having a maximum runout of 0.001″. A bearing of this precision might readily cost ten times the bearing with the larger error and it is therefore not commercially feasible to utilize bearings of such extreme precision.

As indicated above, the reading error may be brought about not only by bearings which were given solely as an example but other mechanical elements of the system, such for example as the coupling between the encoder disc shaft and the element, the position of which is to be determined, for example, a radar antenna.

I have discovered that errors such as those discussed above need not be eliminated by the utilization of high precision bearings, couplings, or the like but may be compensated for so that despite the erroneous position of the disc the readout indicia will be correct. One method for achieving this result is to provide means for refracting the light falling upon the photocells through which a readout of the disc position is obtained, the degree of refraction being in proportion to the error at the particular rotational position. Thus the code disc shaft is rotated through a complete revolution, the true angular position being determined at intervals by means of a theodolite or the like and the readout likewise being taken at each position; the error, that is, the difference between the theodolite reading and the indicated reading is then plotted and a compensating disc or cam made which has an outline which is a mirror image of the eror correction, thus causing each positional error to be compensated for. This compensating disc is then utilized to cause the refracting means to modify the position of the light beams so that a true readout is obtained.

It is an object of the invention to provide a method of compensating for lack of precision in the mechanical elements of an analog to digital encoder.

It is another object of the invention to provide a compensating means whereby, although the actual position of the encoder shaft and disc are incorrect, the readout digital amount is correct.

It is a further object of the invention to provide such a means which includes a refractor mounted in the path of light from a light source through the encoder tracks to the associated light-sensitive devices whereby the light beams are always correctly positioned to render the photosensitive devices operative or inoperative as the case may be despite the fact that the light beams would be inaccurately positioned were the refractor not present.

It is another object of the invention to provide a means to produce movement of the refractor which means is mounted for rotation with the code disc and has an outline which embodies the error compensation curve.

Other objects and features of the invention will be apparent when the following description is considered in connection with the annexed drawings, in which, FIGURE 1 is a fragmentary elevational view of an encoder disc and its mounting showing in addition a second disc having a compensating element mounted thereon and showing also a refraction means for correctly positioning the light beams falling upon a plurality of photoelectric cells;

Figure 1:
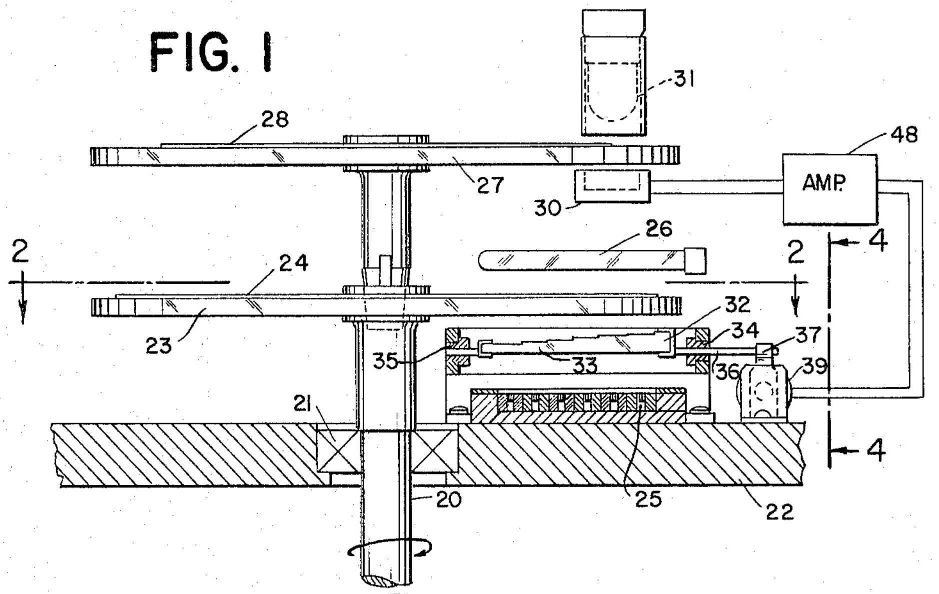
Figure 2:
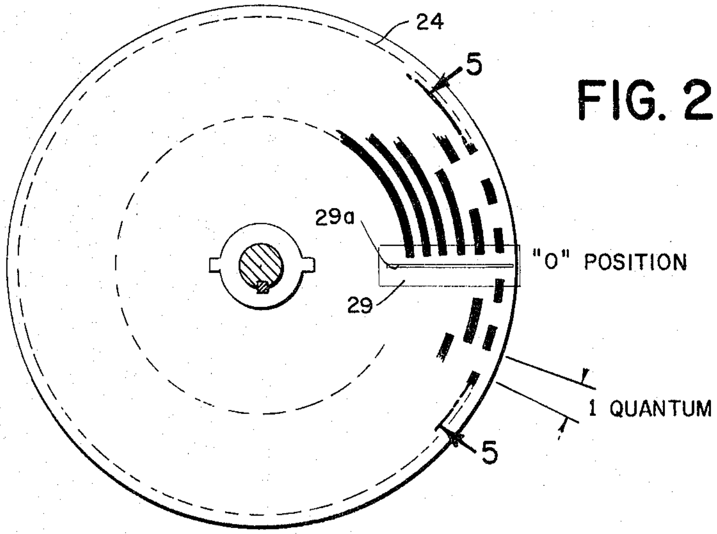
FIGURE 2 is a cross-sectional view taken on the plane of the line 2—2 of FIGURE 1 and showing particularly the arrangement of the code tracks on a typical encoder disc, it being understood that this is a very simplified showing of such a disc.

Referring now to the drawings and particularly to FIGURES 1 and 2 thereof, there is shown a shaft 20, which is mounted for rotation in a bearing 21 fixed in a support 22. Shaft 20 is coupled by any suitable means to a rotary device, such for example as a radar antenna, the angular position of which is to be accurately determined and indicated in digital form.

Mounted on the shaft 20 is a transparent disc 23 which forms the backing for a thin disc of plastic or other material 24. The disc 24 is provided with a plurality of circumferential tracks located at different radii and each having transparent and opaque portions forming a code, usually either a straight binary code or a modification thereof. As is well known, these encoding discs are prepared with great accuracy so that the angular position of a shaft can be indicated with extreme precision such, for example, as 0.001 part of a complete rotation.

In the usual manner a plurality of light-sensitive devices, as for example photosensitive cells, are mounted in a group on the fixed support 22, these cells being designated 25. There is a cell for each track of the encoder discs and the cells are arranged in the group lying on a radial line. Mounted on the opposite side of the discs 23 and 24 is a light source 26, this arrangement serving to energize the cells 25 in accordance with the passage of light thereto through the opaque and transparent portions of the encoder disc 24 which occur on the particular radial line which lies directly above the photocells 25 at the particular instant at which the reading is taken, the light beams entering the photocells are restricted in a circumferential direction due to the use of the plate 29 having a radial slit 29*a* therein.

By means of well known circuitry the output of the photocells 25 is transformed into a decimal digital reading so that the exact angular position of the shaft is determinable at any instant by merely observing the indication given on the readout panel or the like.

As indicated hereinabove, unless the tolerances of the system components, such for example the tolerances of the bearing 21 are held to extremely close limits, errors in the readout may be produced. Since, as explained, the reduction of the shaft eccentricity would require a precision of machine operations which would greatly increase the cost, this mode of guarding against error, although it has been used in the past, is not economically feasible. I therefore supply the means hereinafter described for compensating for such lack of precision of mechanical components.

Fixed to the shaft 20 for rotation therewith is a second transparent disc 27 to which there is affixed for rotation therewith an opaque generally disc-like member 28, the exact outline of which is, however, non-circular and which, as will appear later, provides a means for compensating for the error induced by the lack of complete precision of the bearing. Mounted below the disc 27 is a photocell 30 upon which light from a light source 31 impinges, the quantity of light being determined by the angular position of the disc 28. The output of photocell 30 is amplified by amplifier 48 and fed to an electromagnet coil as will be described.

Mounted between the encoder disc support 23 and the group of photocells 25 is a light refracting plate 32 which plate extends radially and is tapered, the thicker portion being at the greater radius and the thinner portion at the lesser radius. This refracting plate 32, although stated to be tapered, is preferably stepped as indicated at 33, the horizontal portions lying beneath code tracks and the vertical portions between those tracks. The refractor plate 32 is mounted for oscillation in bearings 34 by means of the stub shaft 35 and shaft 36. Shaft 36 carries an arm 37 which forms the armature of an electromegnet 38, see also FIGURE 4, which magnet is mounted on the fixed support 22 and to which the coil 39 of the amplified output of photoelectric cell 30 is applied.

Figure 4:
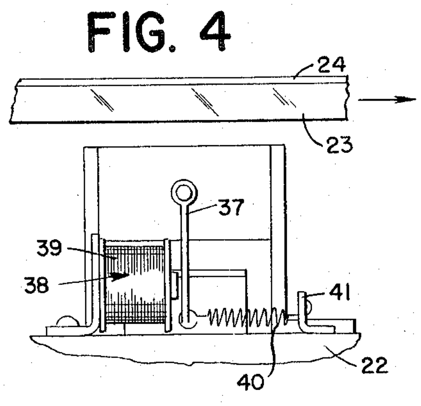
FIGURE 4 is a fragmentary side elevational view of the encoder disc and its mounting looking in the direction of the arrows 4—4 of FIGURES 1 and 2 showing particularly the means for rotating the shaft which carries the refracting means.

As shown in FIGURE 4, armature 38 is moved in a counterclockwise direction when magnet 38 is energized, this motion being resisted by a tension spring 40 extending between the armature and a bracket 41 likewise fixed to the support 22.

The strength of spring 40 is so adjusted that when the disc-like member 28 provides no correction the magnetic pull of magnet 30 is balanced by the spring 40 and the armature 37 remains in the vertical position shown in FIGURE 4 in which position there is no refraction of the light beam passing from the lamp 26 through the encoding disc 24 and entering the photocells 25.

As indicated hereinabove, the disc-like member 28 is not, in fact, exactly circular in outline but is instead provided with an outline such that the position of the refractor plate is proportional to the error introduced by the bearing 21, but in the opposite direction. Thus by oscillating the refractor plate to either side of its center position both positive and negative errors can be corrected.

Figure 3:
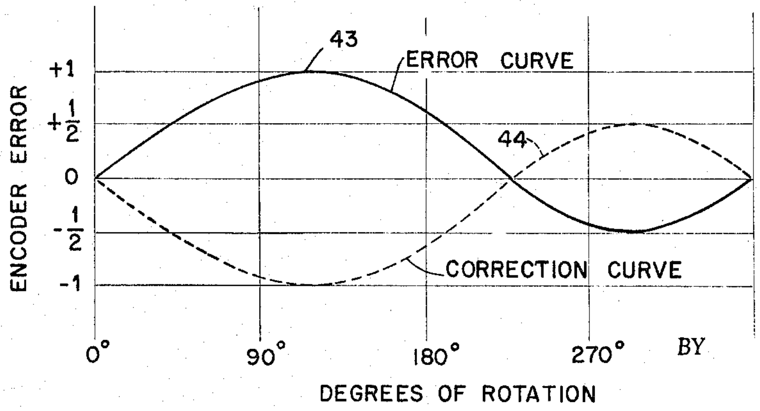
FIGURE 3 is a curve showing the reading error plotted against the true angle of rotation of the encoder disc in rectangular coordinates. This figure also shows in dotted lines a correction curve which is the mirror image of the error curve.

The method of preparing the disc 28 comprises first producing an error curve such as that shown in FIGURE 3. This is done by plotting the encoder error against the angular shaft position (FIG. 3) for a plurality of positions extending throughout a complete cycle of rotation. The encoder error is determined by reading the angular position as determined by a theodolite and the angular position as indicated by the readout device and plotting the difference, preferably expressed in quanta, together with its sign, for each angular shaft position. Once the error curve 43 has been thus determined its mirror image 44 can of course be drawn as indicated merely by reversing the sign of each plotted point on the error curve.

It should be stated that the plotting of the error curve is performed with a temporary disc on the transparent disc 38 in place of the disc-like member 28, this temporary disc having a radius such that at the zero position the photocell 30 receives ½ of the maximum amount of light which may fall upon it.

Thus armature 37 is positioned in its normal central position as modified by the eccentricity imparted to the temporary "zero" correcting disc by the lack of precision of the bearing. Plate 32 is positioned correspondingly and the error curve as plotted in the manner heretofore described thus includes any error resulting from the eccentricity of the zero correcting disc.

Figure 8:
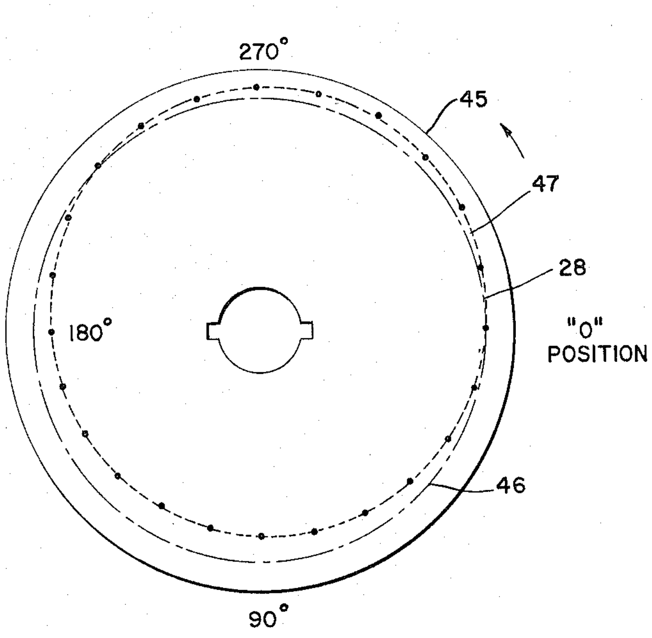
FIGURE 8 is a top plan view illustrating the manner in which the compensating or correction curve of FIGURE 3 is applied to a disc in order to produce a compensating disc having an outline varying from a true circle in a manner to correct for the errors present as indicated by the error curve of FIGURE 3.

Next a disc 45, FIG. 8, having a radius at least as great as that necessary to block all light from the cell 30 is made, the circle 46 having a radius equal to the radius of the zero correction disc laid out thereon. The compensating curve 44 of FIG. 3 is then laid out on the disc 45 by plotting each point radially inwardly or outwardly of the circle 46, the maximum compensation being represented by ½ the distance between circumferences representing full and no admission of light to the photocell 30. Disc 45 is then cut along dotted line 47, FIG. 8, thus forming the compensation or correction disc 28 of FIGURE 1.

The particular error curve shown for illustrative purposes in FIGURE 3 has a maximum positive error of 1 quantum and a maximum negative error of ½ quantum, the maximum positive error occurring when the shaft is rotated 125° from its zero position and the maximum negative error occurring when it has rotated 295° from the zero position. Obviously this is purely illustrative and depends on many factors such as the degree of eccentricity of the bearing, the orientation of the bearing with respect to its supporting plate, etc. Moreover, as indicated hereinabove, the particular component having an error to be compensated, may be other than a shaft bearing.

Figure 5:
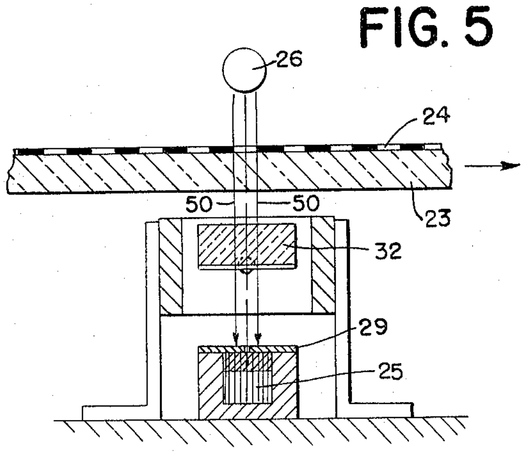
FIGURE 5 is an enlarged vertical cross-sectional view through the encoder disc, refracting means and photocell taken in the direction of the arrows 5—5 of FIGURE 2 showing the refracting means in its normal unoperated, or zero correction, position.
Figure 6:
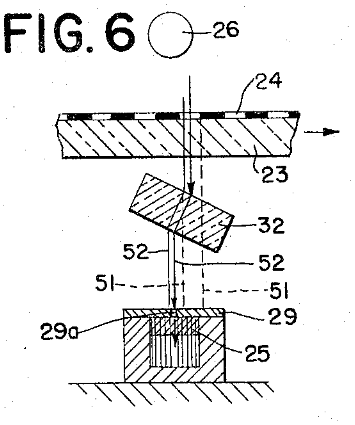
FIGURE 6 is a view similar to that of FIGURE 5 showing the refractor after correcting movement and illustrating the manner in which the position of the refracting means affects the passage of light to the photocell associated with a particular code track on the encoder disc.
Figure 7:
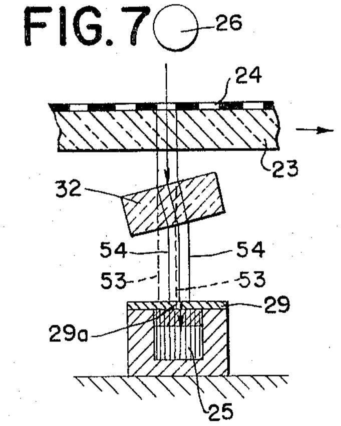
FIGURE 7 is a view similar to FIGURE 6 but showing the refracting means rotated in the opposite direction to correct an error in the opposite sense.

Referring now to FIGURES 5, 6 and 7, there is shown in these figures, to an enlarged scale, fragmentary sections through the encoder disc, lamp and photocells of FIGURE 1 in order to illustrate the manner in which oscillation of the refracting plate 32 corrects for the error at each angular position of the shaft. In FIGURE 5 it will be seen that the plate is in its horizontal or non-correcting position and that a light beam passing through a transparent portion of a particular track passes through the narrow 29a in plate 29 and falls directly upon the photocell as indicated by the full line 50.

In FIGURE 6 there is illustrated the condition when an error is present so that light passing through a transparent portion of the particular track considered would normally be blocked and photocell 30 would not receive any light or would not at least receive sufficient light to cause proper circuit operation and a proper reading. The path of the light beam under normal circumstances is illustrated by the dotted lines 51. However, due to tipping movement of the refractor 32 light enters the photocell correcting for the erroneous position of the encoder disc as is indicated by the full lines 52.

In FIGURE 6 the error is a positive one, that is, the encoder disc has passed one quantum beyond the position which it would have occupied had all elements of the system been precisely correct.

Since the readout mechanism will now correctly indicate the position of the shaft, it is obvious that the use of the refracting plate 32 together with the correction disc 28 has compensated for the error introduced by the mechanical component of the system.

FIGURE 7 illustrates the condition when the error is ½ quantum in the opposite direction. In this case the light passing through a transparent portion of the particular track considered and which would, without the refractor plate, not strike the photocell 25 associated with that track as indicated by dotted lines 53, will now enter the photocell as indicated by full lines 54 and again the error will thus be corrected.

Figure 9:
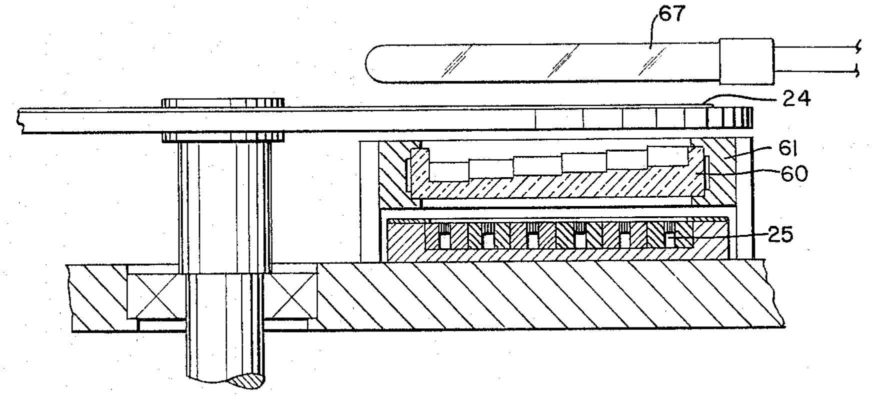
FIGURE 9 is an enlarged view similar to FIGURE 1 showing a modified form of refracting means.
Figure 10:
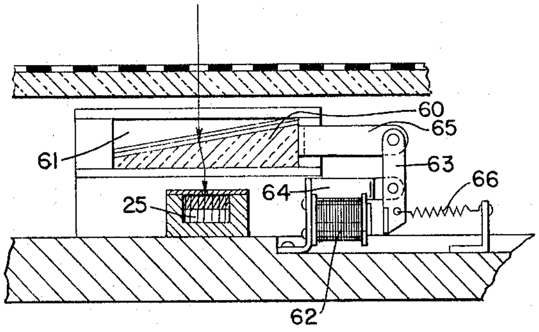
FIGURE 10 is a view taken at right angles to the view of FIGURE 9 and showing the mechanism by which the refracting means is given a translatory movement in either direction from a center position which center position is that for zero error.

In FIGURES 9 and 10 there is shown a modification of the light refracting arrangement wherein the refraction plate is moved longitudinally rather than being oscillated about an axis. In this instance the refraction plate, designated 60, is again placed between the encoder disc 24 and the photocells 25, the plate being stepped as before so that the greatest degree of refraction occurs on that track nearest the circumference of the disc and the least amount on the circumference closest to the center of the disc thus assuring that the amount of refraction will be proportional to the angular length of the smallest code unit of the track considered.

The refractor 60 is mounted in guides 61 for movement along a line parallel to a tangent to the tracks. As shown particularly in FIGURE 10, the refractor 60 is wedge-shaped in its longitudinal dimension and is caused to move longitudinally by means of an electromagnet 62 which acts upon armature 63 pivoted on a fixed support 64 and connected by a pivotal connection to an arm 65 fixed to the refractor 60. The magnet 62 is exactly equivalent to the magnet 38 of FIGURE 1. The refractor 60 is held in the central position by means of a spring 66 which in this central position balances the magnetic pull exerted by current supplied from a photocell such as 30 of FIGURE 1.

The operation of the refractor plate of FIGURES 9 and 10 is essentially the same as that of plate 32 of FIGURES 1 and 4. When no error is present light from the source 67 of FIGURE 9 passes through a transparent part of a particular track and is refracted just enough to enter the photocell 25. However, when an error is present the refractor plate is moved and light which would normally pass through the refractor plate and be directed to the opening in the photocell and thus permit it to receive the light, will be refracted to a greater or lesser extent and will therefore not enter the photocell. On the other hand, light from an adjacent transparent area which would normally not reach the photocell is, by virtue of the increased or decreased refractive effect, caused to enter that cell and thus by moving the refractor plate in accordance with the correction curve the erroneous position of the encoder disc is compensated for and the digital readout rendered correct.

Although I have described the use of a refractor plate and means to move that plate in order to compensate for errors it will be understood that this result may be obtained in other manners. For example, instead of utilizing an opaque compensating disc and a photocell for producing energization of a magnet, it is entirely possible and within the scope of my invention to make the compensating disc a portion of a variable condenser and to thus produce a varying current to operate the reflector plate.

Moreover, although the correction of error resulting from bearing eccentricity has been utilized as an example, the compensating disc might be prepared after the encoder had been installed with the couplings and other equipment completely connected and the error thus compensated for being the overall error in the system rather than the error of a single component. Also, although bearing eccentricity or run out has been specifically discussed, it will be obvious that other bearing errors such as misalignment can also be corrected.

While I have described a preferred embodiment of the invention, it will be understood that I wish to be limited not by the foregoing description, but solely by the claims granted to me.

What is claimed is:

1. In an analog to digital encoder having an encoding disc mounted on a shaft the angular position of which is to be indicated in digital form, the digital indication being subject to error resulting from lack of precision of mechanical components of the system; means for compensating for such lack of precision, comprising in combination, a compensating member mounted on the encoder shaft for rotation therewith, said member having embodied therein a curve representing the error compensation at spaced points in a shaft revolution, and means controlled by said compensating means for modifying the indication to compensate for error and assure a correct indication at all points in a shaft and encoder disc cycle.

2. In an analog to digital encoder of the type having an encoder disc mounted on a shaft the angular position of which is to be indicated in digital form the encoder disc having a plurality of circumferentially extending code tracks with opaque and transparent portions and having light sensitive means on one side of the disc receiving light through transparent portions of said tracks and a light source on the opposite side of said disc; means for compensating for errors in indication of said disc resulting from lack of precision of mechanical components of the mounting and coupling of the disc shaft, said compensating means comprising a light refracting member mounted between the code disc and the light sensitive means, a compensating member mounted on the encoder disc shaft and having embodied therein a curve representative of the error compensation throughout a shaft revolution, and means controlled by said compensating member for moving said refraction member to modify the apparent disc position and provide a correct indication at all points in a shaft and disc cycle.

3. In an analog to digital encoder of the type having an encoder disc mounted on a shaft the angular position of which is to be indicated in digital form the encoder disc having a plurality of circumferentially extending code tracks with opaque and transparent portions and having light sensitive means extending along a radius of the disc on one side of the disc receiving light through transparent portions of said tracks and a light source on the opposite side of said disc; means for compensating for errors in indication of said disc resulting from lack of precision of mechanical components of the mounting and coupling of the disc shaft, said compensating means comprising a light refracting member mounted between the code idsc and the light sensitive means, means mounting said refracting member for oscillation about an axis extending parallel to a radius of the encoder disc, a compensating member mounted on the encoder disc shaft and having embodied therein a correction representative of the error compensation throughout a shaft revolution, and means controlled by said compensating member for oscillating said refracting member about a center position at which no refraction occurs to thereby modify the apparent encoder disc position relative to the encoder light sensitive means and provide a correct digital indication of shaft position throughout a complete revolution of the shaft and disc.

4. In an analog to digital encoder of the type having an encoder disc mounted on a shaft the angular position of which is to be indicated in digital form the encoder disc having a plurality of circumferentially extending code tracks with opaque and transparent portions and having light sensitive means on one side of the disc receiving light through transparent portions of said tracks and a light source on the opposite side of said disc; means for compensating for errors in indication of said disc resulting from lack of precision of mechanism components of the mounting and coupling of the disc shaft, said compensating means comprising, a light refracting member mounted between the code disc and the light sensitive means, a compensating member mounted on the encoder disc shaft, said compensating member being opaque and having a generally circular outline, said outline being modified in accordance with an error curve plotted for a plurality of angular positions spaced throughout a complete shaft cycle, a light source on one side of said compensating member, light sensitive means positioned on the opposite side of said compensating member in a position to receive substantially a median amount of light from said source when a radius of said compensating member corresponding to a point of no error is between said light source and said light sensitive means, and means controlled by said light sensitive means for moving said refracting member to advance or retard the light beams falling upon said encoder disc light sensitive means with respect to the encoder disc in accordance with the variations in radius of said compensating member to thereby provide correct indication of the encoder shaft position at all points in a cycle.

5. In an analog to digital encoder of the type having an encoder disc mounted on a shaft the angular position of which is to be indicated in digital form the encoder disc having a plurality of circumferentially extending code tracks with opaque and transparent portions and having a plurality of light sensitive means spaced along a line parallel to a radius of the encoder disc, each said means being associated with one of the disc tracks, said light sensitive means being on one side of said disc and receiving light through transparent portions of said tracks from a light source on the opposite side of said disc; means for compensating for errors in indication of said disc resulting from lack of precision of mechanical components of the mounting and coupling of the disc shaft, said compensating means comprising a light refracting member mounted on an axis extending parallel to an encoder disc radius and lying between the encoder disc and the plurality of light sensitive means, a compensating member mounted on the encoder disc shaft, said compensating member being opaque and having a generally circular outline, said outline being modified in accordance with an error curve plotted for a plurality of angular positions spaced through a complete shaft cycle, a light source on one side of said compensating member, light sensitive means positioned on the other side of said compensating member in a position to receive substantially a median amount of light from said source when a radius of said member corresponding to a point of no error is between said light source and said light sensitive means, and means controlled by said light sensitive means for oscillating said refracting means to advance or retard the light beams falling upon said plurality of light sensitive means with respect to the encoder disc position, said modification of position of said light beams being proportional to the error compensation represented by the outline of said compensating member.

6. Means for correcting for error in mechanical components of an analog to digital encoder as claimed in claim 5, characterized in that said refracting member is provided with a longitudinal taper whereby the correction effected is proportional to the radial distance of the corresponding track from the shaft center thereby assuring that equal angular correction is effected with respect to all encoder disc tracks.

7. Means for correcting for error in mechanical components of an analog to digital encoder as claimed in claim 5, characterized in that said refracting member is thicker at its outer end than at the end toward the center of the encoder shaft, said member being stepped, the juncture between steps occurring at points between code tracks on the encoder disc whereby the degree of refraction of light beams falling on the plurality of light sensitive means is in proportion to the linear lengths of chords of equal arcs of the encoder disc tracks and the correction for all tracks is thereby equal for all angular positions of the encoder shaft and disc.

8. In an analog to digital encoder of the type having an encoder disc mounted on a shaft the angular position of which is to be indicated in digital form the encoder disc having a plurality of circumferentially extending code tracks with opaque and transparent portions and having light sensitive means extending along a radius of the disc on one side of the disc receiving light through transparent portions of said tracks and a light source on the opposite side of said disc; means for compensating for errors in indication of said disc resulting from lack of precision of mechanical components of the mounting and coupling of the disc shaft, said compensating means comprising a light refracting member mounted between the code disc and the light sensitive means, said light refracting member being generally rectangular in shape having a thickness greater at one end than at the other, said refracting member being mounted for longitudinal reciprocation along a line parallel to a tangent to said encoder disc, a compensating member mounted on the encoder disc shaft and having embodied therein a correction curve representative of the error compensation throughout a shaft revolution, and means controlled by said compensating member for reciprocating said refracting member about a center position to thereby modify the apparent encoder disc position relative to the encoder light sensitive means and provide a correct digital indication of shaft position at all points throughout a complete revolution thereof.

9. In an analog to digital encoder of the type having an encoder disc mounted on a shaft the angular position of which is to be indicated in digital form the encoder disc having a plurality of circumferentially extending code tracks with opaque and transparent portions and having a plurality of light sensitive means spaced along a line parallel to a radius of the encoder disc, each said means being associated with one of the disc tracks, said light sensitive means being on one side of said disc and receiving light through transparent portions of said tracks from a light source on the opposite side of said disc; means for compensating for errors in indication of said disc resulting from lack of precision of mechanical components of the mounting and coupling of the disc shaft, said compensating means comprising a light refracting member mounted for reciprocation along a line parallel to a tangent to the encoder disc, said light refracting member being generally rectangular in shape and of varying thickness in the direction of reciprocation, said refracting member lying between the encoder disc and the plurality of light sensitive means, a compensating member mounted on the encoder disc shaft, said compensating member being opaque and having a generally circular outline, said outline being modified in accordance with an error curve plotted for a plurality of angular positions spaced through a complete shaft cycle, a light source on one side of said compensating member, light sensitive means positioned on the other side of said compensating member in a position to receive substantially a medium amount of light from said source when a radius of said member corresponding to a point of no error is between said light source and said light sensitive means, and means controlled by said light sensitive means for reciprocating said refracting means to advance or retard the light beams falling upon said plurality of light sensitive means with respect to the encoder disc position, said modified position of said light beams being proportional to the error compensation represented by the outline of said compensating member.

10. Means for correcting for error in mechanical components of an analog to digital encoder as claimed in claim 9 characterized in that said refracting member is tapered in a direction perpendicular to its axis of reciprocation whereby the correction effected is proportional to the radial distance of the corresponding track from the shaft center thereby assuring that equal angular correction is effected with respect to all encoder disc tracks.

11. Means for correcting for error in mechanical components of an analog to digital encoder as claimed in claim 9 characterized in that said refracting member is thicker at the side adjacent the encoder disc circumference than at the side toward the center of the encoder shaft, said member being stepped, the juncture between the steps occurring at points between code tracks whereby the degree of refraction of light beams falling on the plurality of light sensitive means is in proportion to the linear lengths of chords of the encoder disc tracks and the correction for all tracks is thereby equal for each angular position of the encoder shaft and disc.

References Cited by the Examiner

UNITED STATES PATENTS 3,046,541 7/1962 Knox ---------------- 340—347

MAYNARD R. WILBUR, *Primary Examiner.*

DARYL W. COOK, L. W. MASSEY, *Examiners.*

W. J. KOPACZ, *Assistant Examiner.*